(12) United States Patent
Witzel

(10) Patent No.: US 10,181,006 B2
(45) Date of Patent: Jan. 15, 2019

(54) METHOD FOR PRODUCING COMPLEX PRODUCTS, IN PARTICULAR MOTOR VEHICLES

(71) Applicant: VOLKSWAGEN AKTIENGESELLSCHAFT, Wolfsburg (DE)

(72) Inventor: Martin Witzel, Wolfsburg (DE)

(73) Assignee: Volkswagen AG (DE)

( * ) Notice: Subject to any disclaimer, the term of this patent is extended or adjusted under 35 U.S.C. 154(b) by 420 days.

(21) Appl. No.: 14/895,361

(22) PCT Filed: Mar. 13, 2014

(86) PCT No.: PCT/EP2014/054976
§ 371 (c)(1),
(2) Date: Dec. 2, 2015

(87) PCT Pub. No.: WO2014/195036
PCT Pub. Date: Dec. 11, 2014

(65) Prior Publication Data
US 2016/0117438 A1    Apr. 28, 2016

(30) Foreign Application Priority Data

Jun. 3, 2013   (DE) .................. 10 2013 009 201
Jul. 4, 2013   (DE) .................. 10 2013 011 168
Jan. 13, 2014  (DE) .................. 10 2014 200 384

(51) Int. Cl.
G06F 17/50   (2006.01)

(52) U.S. Cl.
CPC .......... *G06F 17/5095* (2013.01); *G06F 17/50* (2013.01); *G06F 2217/04* (2013.01); *Y02T 10/82* (2013.01)

(58) Field of Classification Search
CPC .. G06F 17/5095; G06F 17/50; G06F 2217/04; Y02T 10/82
(Continued)

(56) References Cited

U.S. PATENT DOCUMENTS 6,268,846 B1   7/2001  Georgiev
7,453,459 B2   11/2008 Shekter
(Continued)

FOREIGN PATENT DOCUMENTS

EP   1008112 A1    6/2000
JP   2006113809 A  4/2006

OTHER PUBLICATIONS

Z.M. Qui, K.F. Kok, Y.S. Wong, Jerry Y.H. Fuh, "Role-based 3D visualization for asynchronous PLM collaboration" Science Direct, Apr. 8, 2007, pp. 747-755.*
(Continued)

*Primary Examiner* — Dwin M Craig
(74) *Attorney, Agent, or Firm* — Barnes & Thornburg LLP

(57) ABSTRACT

A method for producing a complex product, in particular a motor vehicle, wherein a component is constructed for the product. Data having a three-dimensional representation of the component is generated in a first data format for a first program and data having meta-information on the three-dimensional representation of the component is generated in an electronically searchable data format for a second program. Additionally, the data having the three-dimensional representation of the component in the first data format is embedded into the data in the second data format. A third program is provided for establishing communication between the first and the second program.

9 Claims, 10 Drawing Sheets

(58) Field of Classification Search
USPC .............................................................. 703/1
See application file for complete search history.

(56) References Cited

U.S. PATENT DOCUMENTS

| | | | |
|---|---|---|---|
| 2002/0035451 A1* | 3/2002 | Rothermel | G06F 17/50 |
| | | | 703/1 |
| 2005/0203718 A1* | 9/2005 | Carek | G06F 17/50 |
| | | | 703/1 |
| 2006/0256136 A1 | 11/2006 | O'Donnell et al. | |

OTHER PUBLICATIONS

Office Action for Korean Patent Application No. 10-2015-7036676; dated Jan. 16, 2017.
Anonymous; i-model plug-in for Adobe Reader; Leverage i-models for intelligent 3D PDF; May 19, 2014; downloaded from http://web.archive.org/web/20130810044018/http://www.bentley.com/zh-TW/Free+Software/imodel+plugin+adobe+reader.htm.
Qiu et al.; Role-based 3D visualisation for asynchronous PLM collaboration; Computers in Industry; Dec. 2007; vol. 58, Issues 8-9; pp. 747-755.
Search Report for International Patent Application No. PCT/EP2014/054976; dated May 27, 2014.

* cited by examiner

Contents of the technical drawing:

- Parts list
- Part master data
- Other applicable documents
- Tolerances
- Part identification (relevant to geometry, bidirectional)
- Reference points/connecting elements (relevant to geometry, bidirectional)
- Changes, comments (relevant to geometry, bidirectional)
- Etc.

Appended files (FileAnnotations):

- 1 JT file (monolithic)
- 1..* PDF files (PDF/A) (relevant to geometry, bidirectional)
- 1 XML file (connecting information)
- 1 HTML file (connecting information) (relevant to geometry, bidirectional)
- Etc.

FIG. 6

| Änderungen (einschl. Historie) Changes (incl. history) | | | | |
|---|---|---|---|---|
| Nr. / No. | CAD Referenz / CAD reference | | Datum/ Date | Geändert/ Changed |
| | Label/ Label | Ansicht/ View | | |
| - | CHA 003 | CHA Initial Capture | 3.3.2012 | - |
| - | | VWG-jtbridge://3DZP/part=T.EST.SSL.SPA.48&jt=1K8_201_12 _3_ZSB_TMT_001_ZSB_TEST-1_14_01_2013_3DZ _P_GL_jt&mv=CHA_Initial_Capture&id=CHA 003&act=GOTO_PMI_AND_MODELVIEW | 2012 | - |
| - | CHA 001 | CHA Initial Capture | 1.1.2012 | - |

FIG. 7

METHOD FOR PRODUCING COMPLEX PRODUCTS, IN PARTICULAR MOTOR VEHICLES

PRIORITY CLAIM

This patent application is a U.S. National Phase of International Patent Application No. PCT/EP2014/054976, filed 13 Mar. 2014, which claims priority to German Patent Application Nos. 10 2013 009 201.9, filed 3 Jun. 2013; 10 2013 011 168.4, filed 4 Jul. 2013; and 10 2014 200 384.9, filed 13 Jan. 2014, the disclosures of which are incorporated herein by reference in their entirety.

FIELD

Illustrative embodiments relate to a method for producing complex products, in particular motor vehicles. A component of the complex product is here fabricated according to a three-dimensional representation of the component, and the complex product is produced making use of the component. Disclosed embodiments also relate to a method for operating a computer.

BACKGROUND

Disclosed embodiments improve a fabrication process of a complex product, in particular a fabrication process for motor vehicles, or to lower the costs of such a fabrication process. Disclosed embodiments create a fabrication process, in particular a fabrication process for motor vehicles in which the number of paper drawings is reduced or which manages entirely without paper drawings. Disclosed embodiment permit or create a paperless long-term archiving of drawings for a fabrication process, in particular for a fabrication process for motor vehicles.

BRIEF DESCRIPTION OF THE FIGURES

Disclosed embodiments are explained with reference to the drawings.

FIG. 6 shows an exemplary embodiment of a structure of a 3-D document (PDF/A-3a);

FIG. 7 shows an exemplary embodiment of a JT reference in the document;

DETAILED DESCRIPTION OF THE DISCLOSED EMBODIMENTS

Figure 1:
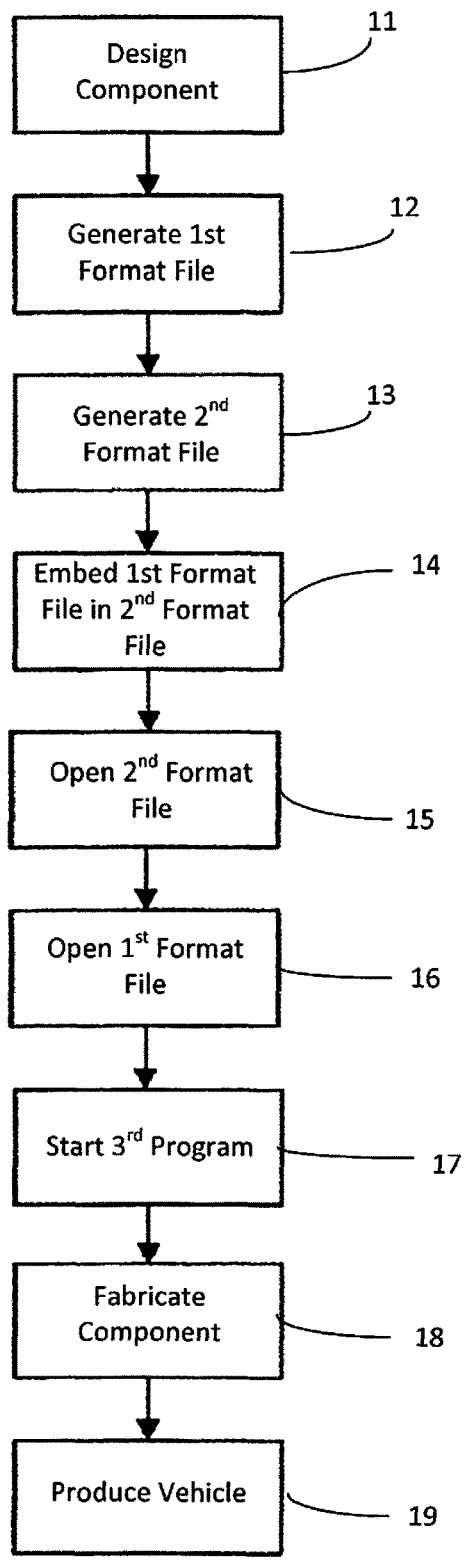
FIG. 1 shows an exemplary embodiment of a method for producing a motor vehicle.

Disclosed embodiments provide a method for producing a complex product, in particular a motor vehicle, with the following steps:

designing a component for the product,
storing (or generating a file with) a three-dimensional representation of the component in a first data format for a first program,
storing (or generating at least one file with) meta-information of the three-dimensional representation of the component in an electronically searchable second data format for a second program,
in particular, embedding the file with the three-dimensional representation of the component in the first data format in the file in the second data format,
opening the file in the second data format by means of the second program for the representation of the meta-information,
(automatically) opening the file in the first data format by means of the first program for the three-dimensional representation of the component,
(automatically) starting a third program for (in particular asynchronous and/or bidirectional) data exchange between the first program and the second program (for assignment of the meta-information to (at least one item in) the three-dimensional representation of the component),
fabricating a component according to the three-dimensional representation of the component,
producing the complex product using the component.

Meta-information is, in particular, additional information for a technical drawing (in particular, however, not dimensional information, tolerance information, information on surface properties and/or transition or bend radii), or can comprise such information. Meta-information can be textual and/or graphical information. Meta-information can be parts lists, (part) master data, tolerances, part identifications, reference points, connecting elements, changes and/or comments, or can comprise such information. Meta-information can comprise information about standards to be used or observed. Meta-information can comprise the information of a change field in a technical drawing. Meta-information can comprise the information within a title block of a technical drawing. Meta-information can comprise color relevance. Meta-information can comprise a hyperlink, in particular a hyperlink to another file. Another file in this sense is, in particular, a file in a format other than the first data format.

A three-dimensional representation of a component comprises in particular dimensional information and/or tolerance information. A three-dimensional representation of a component comprises, in particular, information on surface properties and on transition or bend radii. A three-dimensional representation of a component is, in particular, multicolored.

A third program is, in particular, implemented as a background process.

The three-dimensional representation of a component takes place in a first window, while the representation of the meta-information takes place in at least one second window.

Disclosed embodiments provide a method for operating a computer with the following steps:

providing a file with a three-dimensional representation of a component (in particular for a motor vehicle) in a first data format for a first program, as well as providing at least one file with meta-information for three-dimensional representation of the component in an electronically searchable second data format for a second program, wherein the file with the three-dimensional representation of the component in the first data format is embedded in the file in the second data format, opening the file in the second data format by means of the second program, (automatically) opening the file in the first data format by means of the first program for three-dimensional representation of the component, in particular in a first window, (automatically) starting a third program for (in particular asynchronous and/or bidirectional) data exchange between the first program and the second program (for assigning the meta-information to (at least one item in) the three-dimensional representation of the component), representing the meta-information, in particular in a second window.

In a further disclosed embodiment, the first and the second windows are open simultaneously. In a further disclosed embodiment, the first file format is .jt. In a further disclosed embodiment, the second file format is .pdf. Jt is a proprietary data format for 3-D data, and is considered to be a compact, easily displayed and content-rich data format which supports both object-data and meta-data. In a further disclosed embodiment, the second program comprises a plug-in for communication with the third program.

In a further disclosed embodiment, the first program and/or the second program is a viewer. A viewer is, in particular, a program by means of which the content of the information displayed by the viewer cannot be changed.

It is particularly provided that the file with the three-dimensional representation of the component cannot be changed by means of the first program. It is, in particular, provided that the meta-information cannot be changed by means of the second program.

In a further disclosed embodiment, the file with the meta-information comprises at least one hyperlink.

In a further disclosed embodiment, a PDF file, an XML file, and/or an HTML file is also embedded in the second file. In a further disclosed embodiment, no WORD file is embedded in the second file. In a further disclosed embodiment, no PowerPoint file is embedded in the second file. In a further disclosed embodiment, no Excel file is embedded in the second file.

A complex product is, in particular, a product that consists of a plurality of individual components.

A motor vehicle is, in particular a land vehicle that can be used individually in road traffic. Motor vehicles are, in particular, not restricted to land vehicles with combustion engines.

FIG. 1 shows a method for producing a motor vehicle, whereby a component for the motor vehicle is designed in step 11. A step 12 follows, in which a file with a three-dimensional representation of the component is generated in a first data format for a first program. In a following step 13, a file with meta-information for the three-dimensional representation of the component is generated in an electronically searchable second data format for a second program. In a step 14, the file with the three-dimensional representation of the component (in the first data format) is embedded in (or appended to) this file.

In step 15 there follows the provision of the file in the second data format with the embedded file with the three-dimensional representation of the component (in the first data format), and opening the file in the second data format by means of a second program as well as, in a step 16, opening, in particular automatically, the file in the first data format by means of the first program for the three-dimensional representation of the component. In addition, in a step 17, a third program is started as a background process for the asynchronous and bidirectional data exchange between the first program and the second program. By means of the first program, the component is represented in a three-dimensional representation in a first window on a screen. By means of the second program the meta-information is displayed in one or a plurality of further windows by means of the display.

Subsequently, in a step 18, the component is fabricated according to the three-dimensional representation of the component, and the vehicle is produced in a step 19 using this component.

Figure 2:
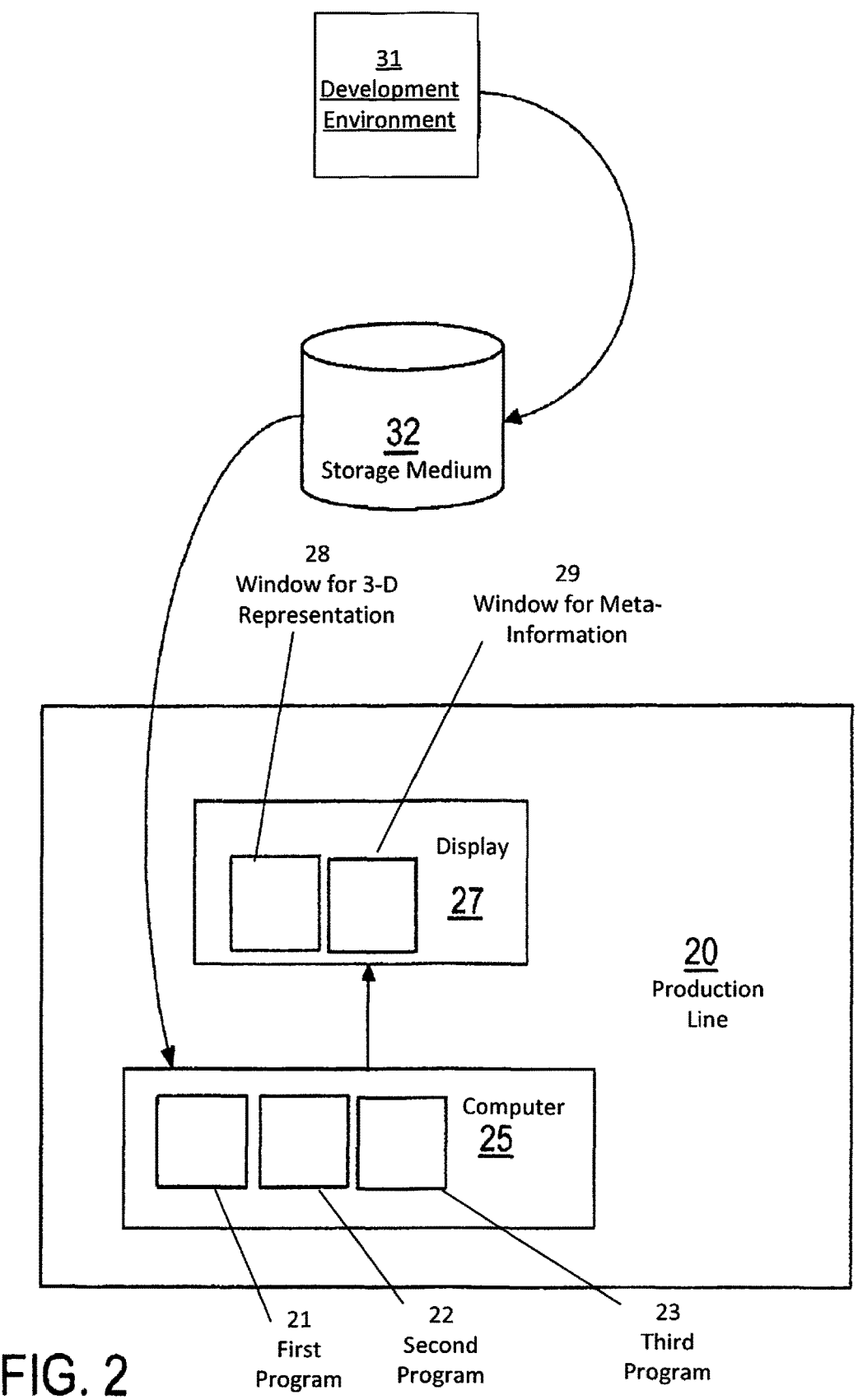
FIG. 2 shows an exemplary embodiment of a system for implementing the method of FIG. 1.

FIG. 2 shows a system for implementing the method according to FIG. 1. Reference sign 20 here indicates a production line for fabricating a motor vehicle or part of a motor vehicle, and reference sign 31 identifies a development environment for the design and development of components for a motor vehicle. In this development environment 31, the file in the second data format with the embedded file in the first data format is generated, and is stored in a storage medium 32, and thereby made available to the fabrication environment 20 or to its IT facility. A computer 25 with the first program 21, the second program 22 and the third program 23 is provided in the fabrication environment 20. The computer 25 controls a display 27 for representing a window 28 for the three-dimensional representation of the component, as well as a window 29 for representing the meta-information. The display 27 can comprise one or a plurality of monitors.

The method according to FIG. 1 is explained, by way of example, below, wherein the first data format is .jt and the second data format is .pdf. The first program here is JP2Go or VisMockup, and the second program is Adobe Reader or Adobe Acrobat, each of the latter being supplemented by a plug-in. The third program is referred to below as JTBridge.

Figure 3:
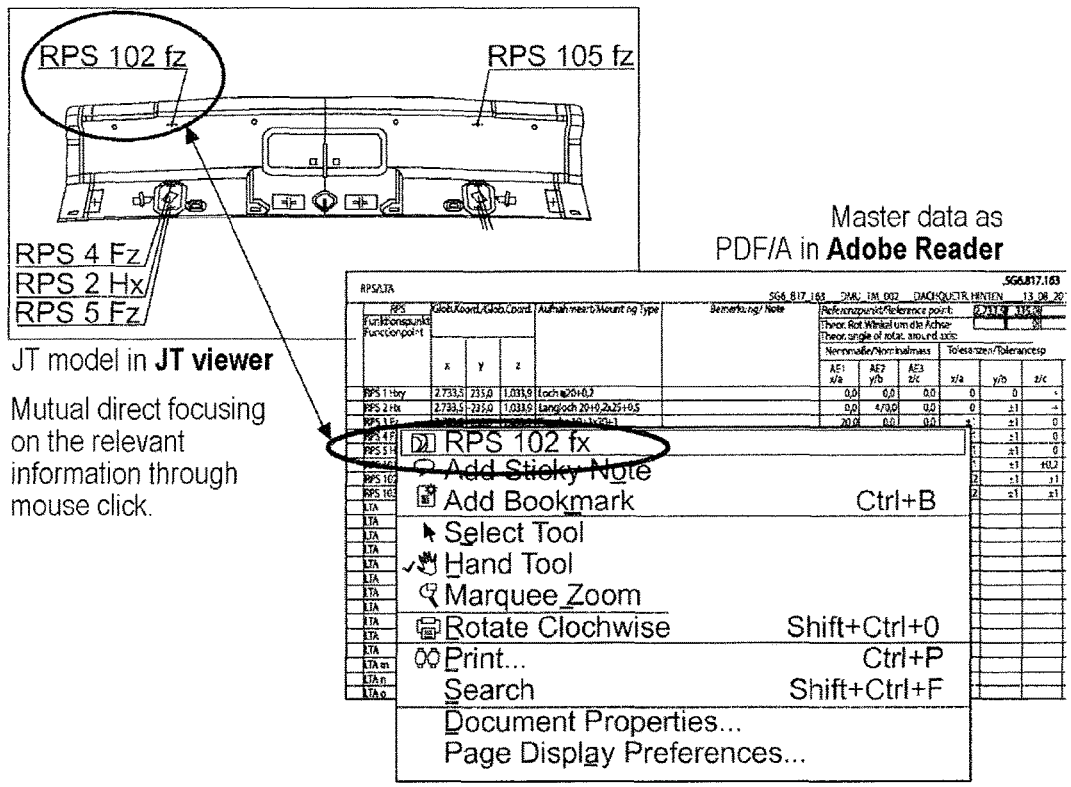
FIG. 3 shows an exemplary embodiment of linking the information in the document with a 3-D geometry.

The primary function of the JTBridge is to establish a bidirectional link between a JT model (three-dimensional representation of the component in .jt format) and meta-information, such as master data, in a PDF/A file. The JT model is embedded in the PDF/A file, and is referred to below, together with these, as the 3-D document. Depending on agreement and technical conditions, the files are opened for viewing in the application assigned to the respective file format. This allows the format-specific functions of the viewer to be used. FIG. 3 shows such a session in which the 3-D model belonging to the master data is open in a parallel 3-D viewer. The user can call up the associated 2-D/3-D information through simple interaction.

Figure 4:
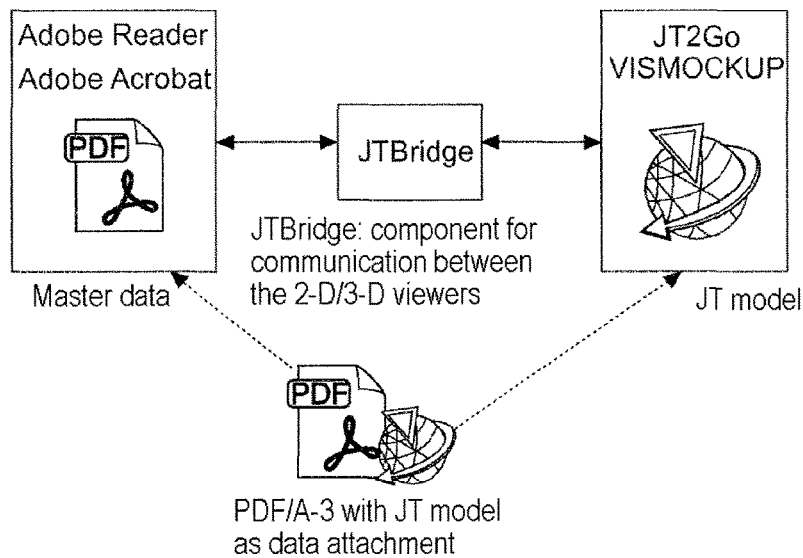
FIG. 4 shows an exemplary embodiment of a JTBridge.

The JT model and the PDF file are opened in parallel in the viewer that is assigned to the file types by the operating system. This is carried out independently and without any link to one another. Knowledge about the linking between the 2-D data and the 3-D information is, however, explicitly stored in the files or is present inherently. As shown in FIG. 4, the JTBridge, which knows how the appropriate information can be found, is placed between the applications.

It is provided that explicit search functions are not integrated into the viewer through its user interface, such as through menus, toolbars or context menus. Rather is it provided that the linking is described by links which contain all the necessary information in their URI. The purpose of this is that opening the links can be performed largely independently of the documents contained or of the viewer, and HTML, PDF and Office formats can thus be handled in the same way.

The context diagram, the data model, the function model and the interface concept of the exemplary implementation of the method, or part of the method, according to FIG. 1 are described below:

1. Context Diagram

The 3-D document (assembly of partial documents) is opened precisely 1 time in the PDF viewer. Precisely one JT model is, as agreed, contained in the 3-D document, which can be opened in a JT viewer, but does not have to be. These two components are put into a relationship with one another via a coupling. The implementation is achieved using a JT-PDF bridge, which takes over communication outside the two standard components, and passes instructions to the respective other viewer via connection-less, non-blocking messages. The JTBridge bridge is implemented as a background process which is available when 3-D documents are processed, and which is then ended again without interaction with the user. The bridge takes over the communication between precisely one instance of a JT viewer and n Adobe Reader/Acrobat windows, each of which is linked to one PDF file.

The access to the JT model is made from the bridge using the VisAutomation (COM)-interface of the JT2Go/Vis-Mockup viewer, which is part of the standard installation. The 3-D document can only be accessed when a plug-in is integrated into the Adobe Reader, implementing special search mechanisms and handling the communication with the outside. Windows inter-process communication (IPC) is provided as DDE (dynamic data exchange). The data exchanged are of an open nature, containing no components that require protection. The communication therefore does not have to be encrypted. The elements in the messages are, however, encoded as UTF-8. Since the 3-D document has the character of a drawing, only non-modifying operations such as, for example, navigation and filtering, are carried out in the two viewers (JT+PDF), although interactive 3-D forms may also be considered.

Figure 5:
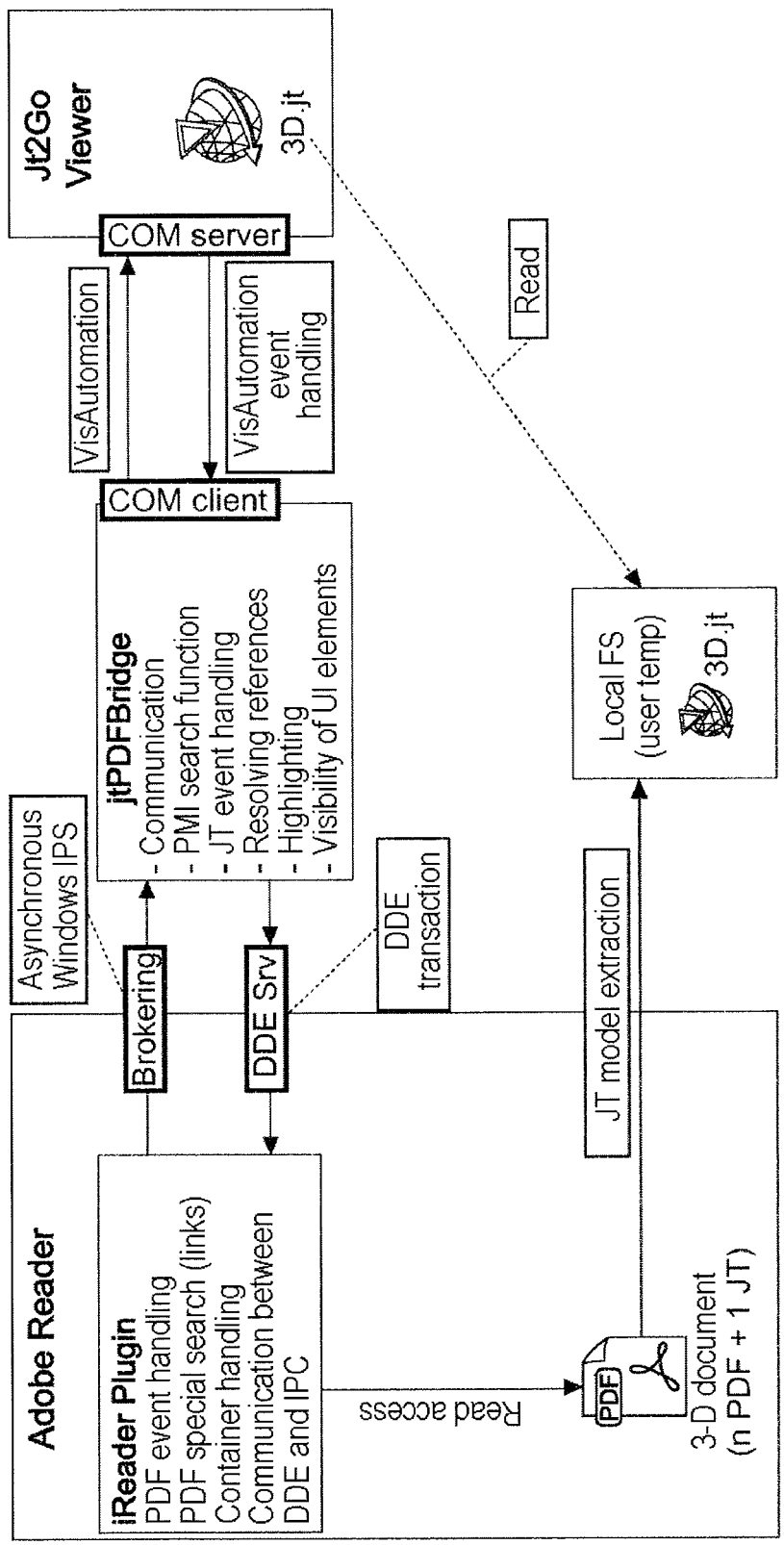
FIG. 5 shows an exemplary embodiment of an architecture and communication paths, protocols, and file storage.

The communication paths, protocols and file storage are represented in FIG. 5. The local file system is used at present to extract the JT file out of the 3-D document (assembly of PDF and precisely 1 JT file as an archive). Only the user-specific cache of Adobe Acrobat is used here (in the user's path). As soon as the AutoOpen function is no longer used, the cache is not required.

2. Data Model

The 3-D document, the structure and resolution of the hyperlinks, and the linking of the text with the JT model, are described below:

2.1 3-D Document

A PDF becomes a 3-D document (JT+PDF/A-3a) as soon as a JT model is inserted into a PDF file as an attachment (i.e. is embedded, in the terminology of the claims). The 3-D document, as well as its elements, must be unrestrictedly capable of long-term archiving in accordance with the objective of the project. For this reason the PDF container is implemented as a PDF-3, and performs a bundling of partial documents into a single LZA document which also includes non-PDF/A files. A PDF/A-1 document avoids dynamic contents to ensure that the information contained can be reproduced in a form true to the original without a limit on time. The following elements of PDF technology can therefore not be used:
PDF/A-3:
active contents
Adobe Flash components (ActionScript)
JavaScript
video or sound
XFA forms technology (static or dynamic)
interactive modifying elements (buttons, checkboxes, etc.)
modification of the document content The structure of the 3-D document can thus be represented fundamentally as shown in FIG. 6. Components of various types are contained in the 3-D document. The purely textual and tabular information is mapped within the (container) PDF file. This includes all the master information that does not have any geometrical relevance to an object inside the JT file. The textual information that refers to a 3-D object or to a PMI differs from this. These establish a unique reference to a scene graph node of the JT model. The referencing logic can here not be integrated into the PDF/A file, since according to the PDF/A standard, no scripts or active contents are allowed. It is also thus not possible to perform back-referencing from the 3-D model to the text information without taking into account the special features of the particular viewer implementations. Non-PDF/A 2-D files such as Excel, PowerPoint, Word or HTML files that can also perform 3-D references can also be contained in the 3-D document. An implementation (allowed there) via scripting languages also depends very heavily on the particular original application, and is therefore not provided. The 2-D/3-D information to be linked is instead uniquely described with hyperlinks—as illustrated in FIG. 7. That permits universal usage within the main PDF/A-3 file, the appended PDF files and the third-party formats such as HTML, Word, PowerPoint and Excel files that are also attached. As a prerequisite, it must be possible to reference the JT model. This requires the scene graph nodes to be uniquely named or uniquely identified through a metadata attribute.

2.2 Structure and Resolution of the Hyperlinks

Figure 8:
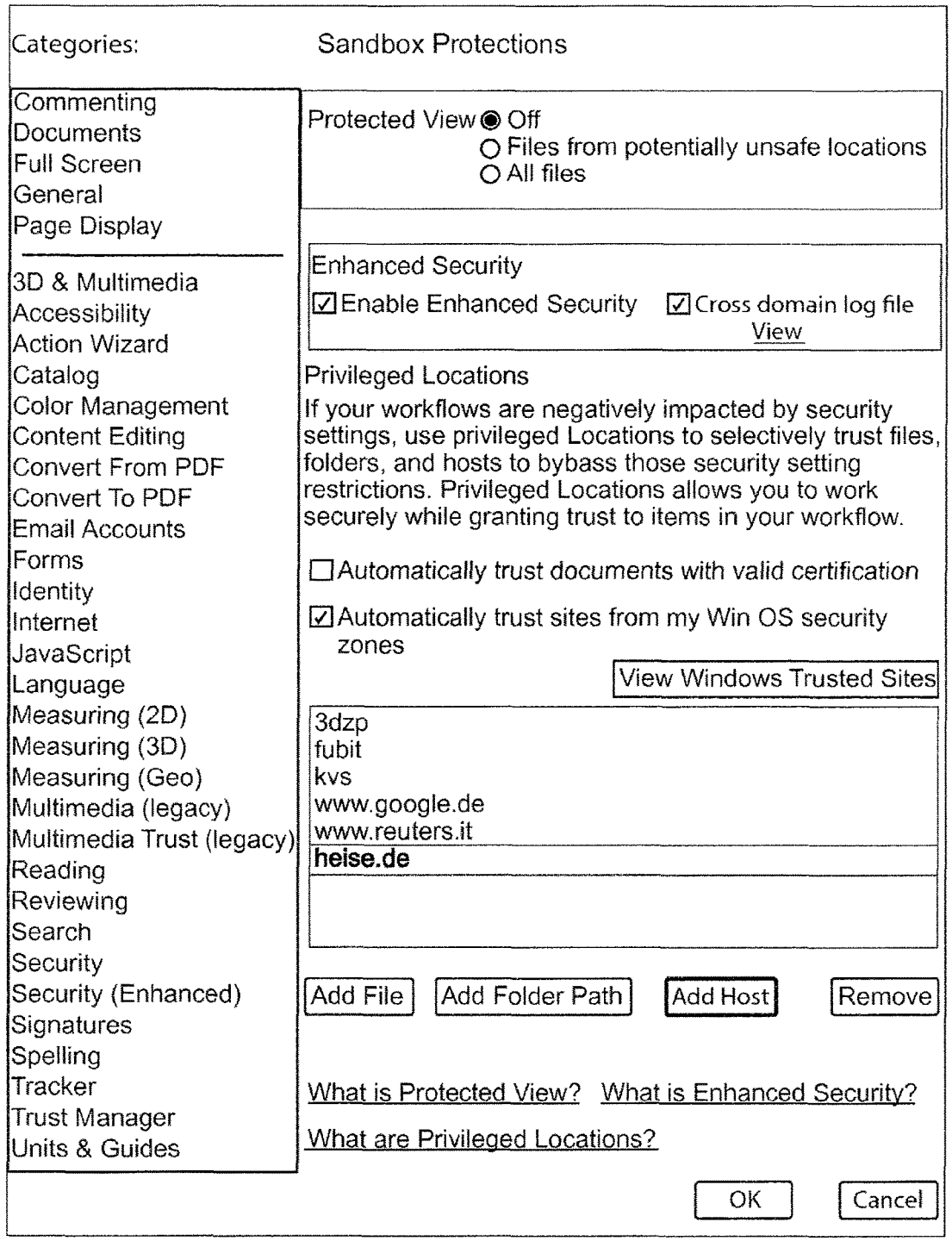
FIG. 8 shows an exemplary embodiment for trusting document links in Adobe Acrobat/Adobe Reader.

A hyperlink within the 3-D document identifies a 3-D object, a specific view, a PMI or an action that is to be carried out on the 3-D model. Since this linking method is not represented by a standard URI scheme, a dedicated URI scheme is defined that specifies all the JT hyperlinks in the 3-D document: vwg-jtbridge. to give enough room for the technical description of the links, a project-relevant element is integrated into the scheme-specific part of the URL. This information takes the place of the host element of an http(s) URL. The host applications considered (Internet Explorer, Firefox, Adobe Acrobat, etc.) considered each implement a trust mechanism for following links. Instead of trusting the protocol across the whole system, the host element is trusted (cf. FIG. 8). The base URL of a JT hyperlink for exemplary application spaces thus takes this form:

| | |
|---|---|
| jtbridge://3dzp | 3-D documents for processes without drawings |
| jtbridge://fubit | functional drilling information (prototype) |
| jtbridge://{project} | general representation |

The information for identification of the JT objects is appended as a parameter to the base URL. The following are required for reference to a PMI:

identification of the JT model jt=[value of the JT file attribute at the root scene graph node]

identification of one or more PMIs, separated by semicolons id=[PMI name1]; [PMI name2]; [PMI nameN]

identification of the PMI view mv=[PMI model view name]

Following the description of the 3-D object, the action is then defined which is to be executed by clicking the link. So far, two kinds of action have been defined for the 3-D document:

Zoom to the PMI model view and selection of the PMI act=GOTO_PMI_AND_MODELVIEW display of a PMI model view of the JT model act=GOTO_MODELVIEW The parameters are separated from one another by an ampersand, "&". The following notation is thus required for a complete JT link:

jtbridge://{PROJECT}/
  jt={MODEL}&id={PMI}&mv={VIEW}&act={ACTION}

2.3 Linking the Text With the JT Model

Sufficient information is supplied along with each of the two technical parts (JT model and PDF document) within the 3-D document that the associated information can be unambiguously identified in the respective other viewer. Firstly, the JT model will be uniquely identified within the JT viewer session. Assignment by means of the filenames is not sufficient here, as this is too ephemeral over the file's lifetime. When the JT file, however, is created, the JT scene graph (SG) is supplemented by a large amount of meta-information in the conversion process using the Siemens JT converters, and this also allows unambiguous identification within a JT viewer session. At the JT root node, the name of the JT file originally generated by the converter is set as such a metadata attribute. We refer to the JT specification in respect of the dependency of the information regarding the scene graphs and representation in the JT model. The usable attribute at the root node of the SG of the JT model is:

Name: Jt File Name:: Type: UTF-8

The attribute is filled with the complete filename, including the .jt ending.

The products of the Siemens JT viewer family are implemented as MDI (multiple document interface) applications. This means that a large number of JT models can be open in parallel in a single JT viewer session. The search algorithm must work through the JT models that are open in the session, in each case looking at nodes of the scene graph for the original name of the JT file which is added there as a metadata element. Consequently, however, this also means that this information must additionally be maintained outside the JT model if the geometry and PMI elements are to be referenced in one document.

It is possible to search specifically for information within the model on the basis of the root node. For this purpose again the naming of the nodes can be used, or however the identification searched for in the metadata. According to the specification of the 3DZP CAD FTA method, anchor points are set to the geometries using FTA annotations. These annotations are transferred as PMI notes into the JT model, which can be assigned to n PMI model views. The naming of the FTA annotations, and therefore also of the PMI notes is done according to the requirements of the relevant technical area. The identifiers so far known and considered include:

| | | |
|---|---|---|
| CHA | [index] | for change entries at the model |
| TXT | [index] | free text at the model |
| PMK | [index] | part identifier |
| RPS | [technical ID] | reference point system |
| LTA | [technical ID] | hole tables |
| HAP, RB | [technical ID] | main position points |
| VEMText, VTA | [technical ID] | joining technology, welding groups |
| [technical ID]_Label | | surface and drilling information |

Figure 9:
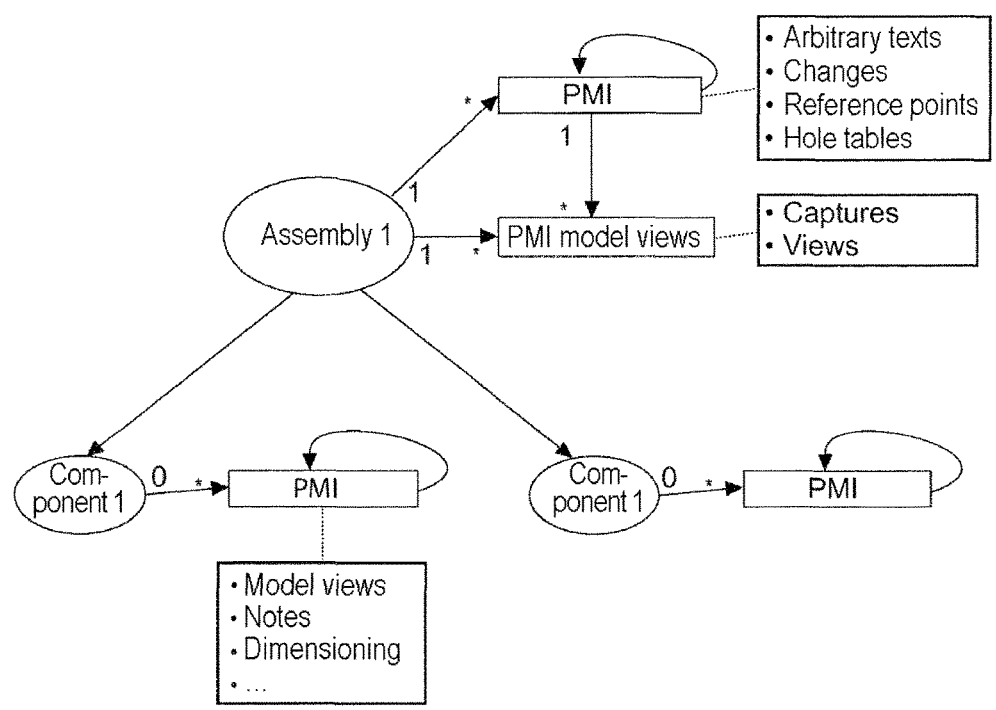
FIG. 9 shows an exemplary embodiment of an organization of PMI information.

It should also be possible to assign the PMI information to the specialized or technical contexts. With respect to the data structures of the PMI information, there are no differences between dimensioning annotations, free text or model views (cf. FIG. 9).

A component or an assembly has a list of PMI elements of equal value. The elements receive their type exclusively through an internal flag. The PMI information used in 3DZP includes:

PMI_TYPE_MODEL_VIEW
PMI_TYPE_NOTE

Figure 10:
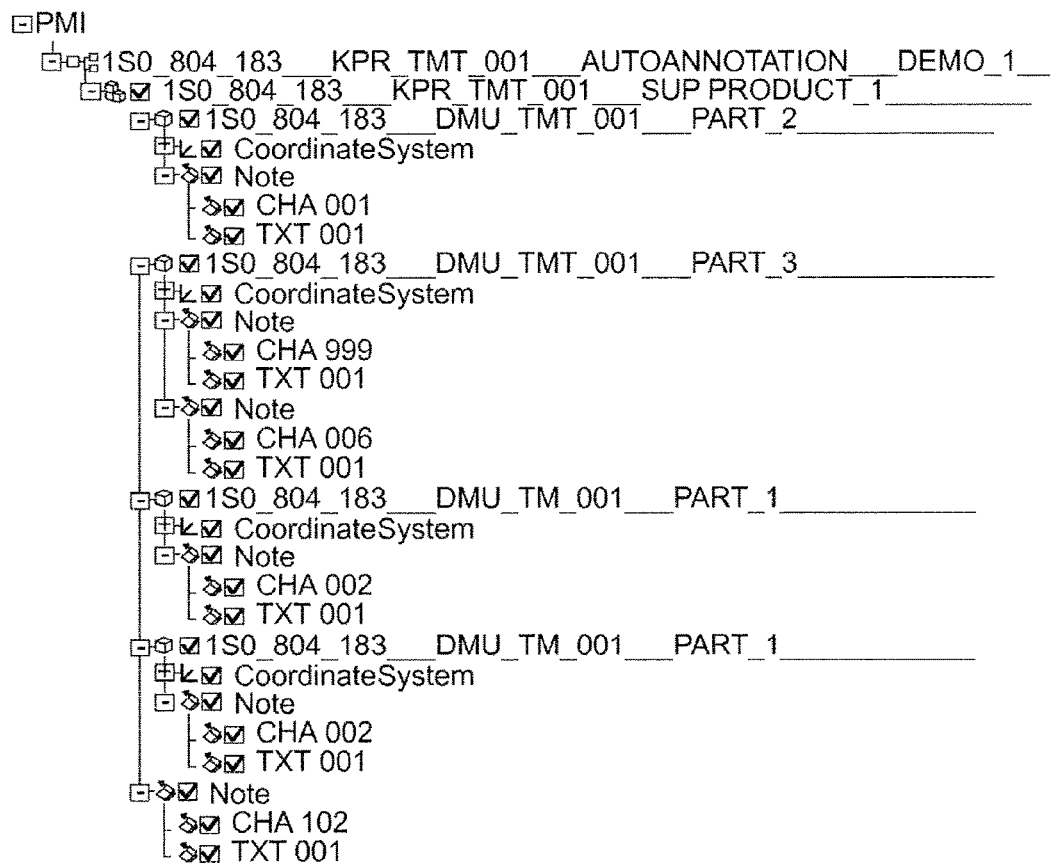
FIG. 10 shows an exemplary embodiment of PMI structure in the JT model for an assembly.

The property of PMI elements of being able to reference each other can also be exploited. In this way the relation of PMI notes to the PMI model views is also specified. An annotation can be assigned to any number of views. It can be seen from this that in a search for PMI information that is to be implemented, a prioritization, or a search in the context in the model views must take place. The aim, therefore, is to place the precise information in the document. FIG. 10 shows the relationship between PMI notes to the CAD product structure in the JT viewer.

In summary, the following information is thus relevant:

Name of the original JT file as metadata in the respective scene graph node of the converted component and assembly as an attribute JT filename Unambiguous naming specification for PMI notes Unambiguous registration of the model views in the document Unambiguous registration of the PMI notes

3.3 Functional Model

The functions of the system are presented below. This includes the functions called up by the user. This section describes the following:

Starting/ending the iReader plug-in

Opening the 3-D document and initializing the jtBridge process

Searching for PMI elements in the JT viewer

Searching for text segments in the PDF/A-3 document

AutoOpen of the 3-D component

Printing the 3-D component and the PDF parts information

Application settings

These are the functions that the user will perceive as activity of the iReader plug-in. Other functional components and internal mechanisms are presented in the section covering the module structure.

4 Interface Concept and Interface Architecture

Figure 11:
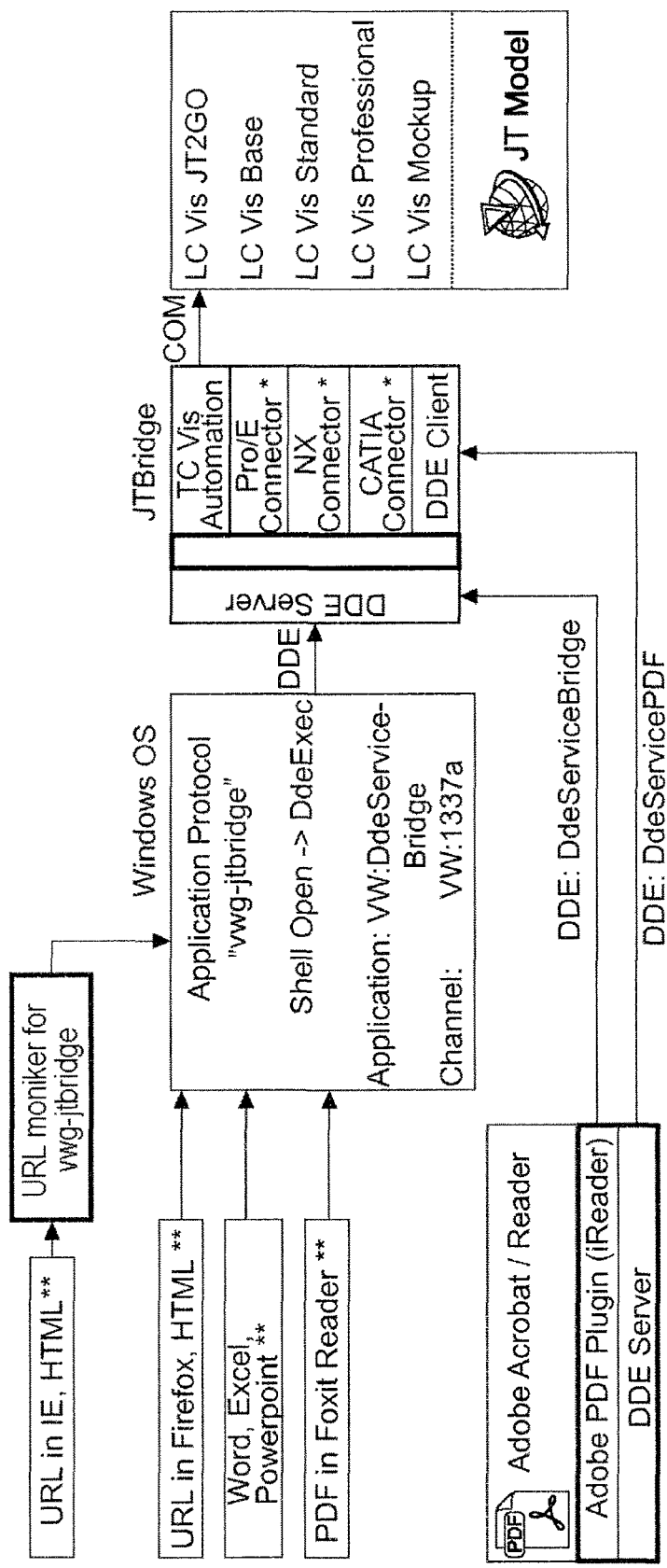
FIG. 11 shows an exemplary embodiment of a complete interface architecture.

The overall interface architecture of the implementation is represented in FIG. 11 and described in more detail below:

4.1 Application Protocol vwg-jtbridge

The vwg-jtbridge URI scheme is registered as an application protocol in the Windows registry under HKEY_CLASSES_ROOT (HKCR). It is thus available throughout the system, and can only be modified with administrator rights. The JTBridge application is assigned to the protocol that is being started, as soon as a jtbridge URL is invoked in an application. The URL is passed to the JTBridge by the Windows shell. Instead of passing the URL, however, as a command-line parameter, it is given to the JTBridge through a DDE conversation. DDE is suitable for the data transfer, since the URL represents a discontinuous datastream, and is available equally to all Windows systems. The protocol is relatively simple, and a plurality of applications can be controlled simultaneously through the inherent topic subscription approach. The transfer rate of ~1000/second is sufficient for all the required functions. It is unimportant here whether a 32-bit or 64-bit Windows application is involved.

4.2 JTBridge

The JTBridge is started when the jtbridge protocol is called. Its task is to exchange information between the 3-D viewers, and/or to execute the desired viewing operations. As a capture point for data, it implements a DDE server which accepts and processes the messages from the Windows shell about the DDE application names DdeServiceBridge and the topic 1337. Above all it is important to prevent the processing of incorrectly formulated URLs, i.e. to ignore URLs that are too long containing harmful code. It is the task of the bridge to check that the URLs that have been passed are correctly formulated, and to map to the correct functions.

The URL is interpreted by the JTBridge, in that the parameters (project, data and function) are extracted from the URL and passed on to the 3-D-viewer-specific methods of the JTBridge. At present, all JT viewers that are based on the Siemens JT PLM Vis components are supported (JT2Go, VisBase, . . . VisMockup). If other formats or viewers are to be considered, appropriate connectors must be drawn up.

Linking 3-D information in the direction of 2-D can also be done through the formulation of hyperlinks. Here, however, all the information inherent to the model is contained, and is mapped through a viewer-specific interface. The JTBridge registers itself through the VisAutomation (COM) interface for application-specific events such as the opening and closing of the JT model or of the viewer, as well as for events at the model that are initiated by the user, such as the selection of a PMI note.

As soon as a search function or operation is to be carried out on the opened PDF component of a 3-D document in an Adobe Acrobat/Reader, the result is passed to the 3DZP iReader plug-in via DDE. Enough information must be contained here to permit an unambiguous identification of the text segment (link) in the PDF.

4.3 iReader Plug-In for Adobe PDF Viewer

The standard applications for the display of the 3-D documents include, amongst others, Adobe Acrobat Standard and Adobe Reader. The DDE method for coupling with the JTBridge can be used to integrate proprietary functions that can be called through an interface from outside into these viewers. An 'iReader' plug-in is provided for this purpose. It implements a DDE server named DdeServiceBridge and the topic 1337, through which DDE messages are received from the JTBridge. The message then has an analogous syntax for link definition.

When, after the selection of a PMI in the JT model by the JTBridge, a message with the following components is sent to the iReader plug-in, this identifies the associated 3-D document amongst all the open PDF files, and searches in it for the hyperlink with the following properties:

Example

Jt=[model name].jt
id=[PMI Id]
mv=[model view]
act=GOTO_MODELVIEW

The 3-D document (PDF) is assigned implicitly to an open JT model. The correct 3-D document is identified in that a search is made in all the open PDF files for FileAnnotations that reference a JT file. If its name corresponds to the JT parameter from the DDE message, the iReader plug-in searches through the relevant PDF for vwg-jtbridge hyperlinks that contain the id and the my from the DDE message as parameters. The plug-in then moves the view to the text location where the link occurs.

The Adobe PDF viewer family implements the treatment of weblinks in such a way that when clicked they are always passed to the standard browser of the system, e.g. Internet Explorer, which is then opened at the same time, and not to the application (JTBridge) assigned by the application protocol. Although the vwg-jtbridge URL is then correctly passed on to the JTBridge and the desired 3-D information is visible in the JT viewer, the 'empty' browser window nevertheless always remains visible. To suppress this, a specific weblink driver for Adobe Acrobat and Adobe Reader can be provided that directly passes the links to the JTbridge, but which continues to open all links other than vwg-jtbridge links in the standard web browser.

A further special feature of the Adobe products is protected mode, in which, through sandboxing, the communication from the PDF with other applications is restricted or fully prevented. The Adobe sandbox is unidirectionally bridged by means of a proprietary broker. All the defined functions of the solution are then available, with the exception of linking from the JT model into the PDF file.

4.4 URL Moniker—Links in Internet Explorer and Firefox

If jtbridge links are directly followed from the context of Microsoft Internet Explorer (IE) from Version 8 on, then application protocols are treated differently. The jtbridge protocol is handled by a COM object (dll), which passes the URL on to the JTbridge for further processing. This process is only necessary for IE. Under Firefox, the JTBridge is directly called and controlled via the vwg-jtbridge protocol.

4.5 Foxit PDF Reader

Besides the Adobe PDF viewer, other PDF viewers also exist that are appropriate for industrial applications. The linking of 2-D links to 3-D objects can be done with the standard distribution of the Foxit PDF reader.

4.6 Microsoft Office (Word, Excel, PowerPoint Etc.)

The jtbridge links in Office documents can be used without restriction. Resolution is carried out by the operating system which passes the control information to the JTBridge.

4.7 JT Viewer Architecture

The JT model contained in the 3-D document is opened in a product of the JT viewer family. This is based on the PLM Vis component technology, with the aid of which the viewer's range of functions are implemented. The viewers are always supplied with the complete automation API. This is even present in the free JT2Go viewer, and can be used for customizing via COM. It is provided here that the following viewer configurations are taken into account:
JT2GO
VisBase
VisStandard
VisProfessional
VisMockup In contrast to the loose coupling between Adobe Reader and Teamcenter Visualization viewers (Tc.Vis.), a narrow link via COM must be implemented between Tc.Vis. and the JTBridge. This is the only way to communicate directively with a JT viewer. All the TC Vis viewers are based on a consistent framework, Siemens PLMVis components. This architecture allows a JT application to be delivered by means of individual, mature components. The applications configured by Siemens include Siemens Teamcenter Base, Standard, Professional and VisMockup. The free JT2GO viewer is also based on this. These applications thus also receive the ability to perform operations on the JT viewer through COM or through a TypeLibrary (VisAutomation.tlb), which is also supplied at the same time.

EP 1 008 112 B1 discloses a method for modeling three-dimensional objects in an interactive computer environment, wherein a two-dimensional representation of a three-dimensional scene is displayed, and wherein the two-dimensional representation defines an image plane. An assignment between a set of control elements of a modeled three-dimensional object and a corresponding set of positions belonging to the scene is formed depending on a user input, wherein the positions represent the set positions in the scene for the control elements of the modeled three-dimensional object. In addition, an orientation of a position of the modeled three-dimensional object in the three-dimensional space is determined on the basis of this assignment, and elements of the modeled three-dimensional object are projected onto the image plane with the orientation and position determined in this way.

U.S. Pat. No. 6,268,846 B1 discloses a computer-implemented method for the generation of a new view of a three-dimensional scene through the reception of three or more images that represent three or more different angles of view onto a plane. US 2006/0256136 A1 discloses a method for the generation of an image composed of both two-dimensional image layers and also of three-dimensional image layers. The image layers are here arranged in sequences. U.S. Pat. No. 7,453,459 B2 discloses a method for the generation of three-dimensional images. Three-dimensional objects are here merged into a scene.

The invention claimed is:

1. A method for producing a complex product, in particular a motor vehicle, the method comprising:
designing a component for the complex product,
generating a file with a three-dimensional representation of the component in a first data format for a first program:
generating at least one file with meta-information of the three-dimensional representation of the component in an electronically searchable second data format for a second program,
embedding the file with the three-dimensional representation of the component in the first data format in the file in the second data format,
opening the file in the second data format using the second program for the representation of the meta-information,
automatically opening the file in the first data format using the first program for the three-dimensional representation of the component in response to opening the file in the second data format using the second program,
automatically starting a third program for data exchange between the first program and the second program in response to opening the file in the second data format using the second program,
fabricating a component according to the three-dimensional representation of the component, and
producing the complex product using the component.

2. The method of claim 1, wherein the three-dimensional representation of the component takes place in a first window, and the representation of the meta-information takes place in at least one second window.

3. The method of claim 2, wherein the first and the second windows are open simultaneously.

4. The method of claim 1, wherein the first file format is .jt.

5. The method of claim 1, wherein the second file format is .pdf.

6. The method of claim 1, wherein the second program comprises a plug-in for communication with the third program.

7. The method of claim 1, wherein the file with the meta-information comprises at least one hyperlink.

8. The method of claim 1, wherein the first program and/or the second program is a viewer.

9. The method of claim 1, wherein a PDF file, an XML file and/or an HTML file is also embedded in the second file.

* * * * *